April 4, 1961  J. WILLEMSEN  2,977,657
DIE MOLDING APPARATUS FOR CONCRETE BLOCKS
Filed July 7, 1958 a# United States Patent Office 2,977,657
Patented Apr. 4, 1961

2,977,657
DIE MOLDING APPARATUS FOR CONCRETE BLOCKS

Johannes Willemsen, De Bilt, Netherlands, assignor to Bredero's Bouwbedrijf N.V., Utrecht, Netherlands, a corporation of the Netherlands Filed July 7, 1958, Ser. No. 746,845

1 Claim. (Cl. 25—120)

The invention relates to an apparatus for moulding a concrete object in a mould at least one wall of which extends in the direction of the ejection of the object from the mould. The mould therefore is concerned with the production of a concrete object at least one surface of which will move along a wall of the mould during the ejection of the moulding from the mould. This method is of course universally known. In this case the moulding has the character of a parallelepiped, and during its ejection it moves along all the sides of the mould.

It is known that the sides of the moulding, which move in this way along the walls of the mould, usually are not faultless. Very frequently they exhibit irregularities, either in the form of holes or as streaks that have been made thereon during ejection. It is a drawback that during vibration of the mortar the suction which the wall of the mould exercises on the surface in question draws up cement through the pores, so that on the wall in question the moulding receives a so-called cement coating. This may easily develop cracks owing to shrinkage, in consequence of which the water-tightness of the wall will be reduced. These cracks owing to shrinkage may also act as initial cracks leading afterwards to places of fracture, so that the bending and tensile strength may be said to deteriorate.

Another drawback of the cement coating is that the moulding thus becomes skiddy, which is undersirable in particular for paving bricks, which naturally have to be as non-skiddy as possible.

In a well-known apparatus the wall of the mould is markedly rough. It is true that by this means a compressive effect is exercised on the moulding, but the above mentioned drawbacks as to the structure of the wall of the moulding will exist even to a heightened degree. Moreover the holes caused by roughness in the wall of the mould will soon be filled with set mortar, and then a normal smooth wall, as referred to above, will again be left.

The invention furnishes a solution for the existing drawbacks.

According to the invention the wall of the mould along which the moulding slides during its ejection from the mould is provided with an elastically yielding member slightly projecting from the surface of the wall and of such shape, that it exerts a levelling action on the concrete sliding along the said wall during the ejection from the mould.

The said projecting member may advantageously be made of rubber or a similar elastic material.

It has been found that the surfaces of concrete mouldings which have been levelled in this way during ejection from the mould differ greatly from the surfaces of mouldings which have not been treated in this way. In the first place the surfaces are entirely homogeneous and tight. Their structure is also more dense, in consequence of which they are also more water-tight and accordingly better resistant to frost. From an aesthetic point of view these surfaces are much superior to the surfaces that have not been levelled and they are extremely non-skiddy.

If a paving block is made according to the invention, provision has to be made for the surface of the moulding destined to form the upper surface of the brick to rest against a wall of the mould which has been provided with the levelling element, e.g. a strip of rubber or similar elastic material.

The inveniton will be explained further with reference to the accompanying drawings.

Figure 1:
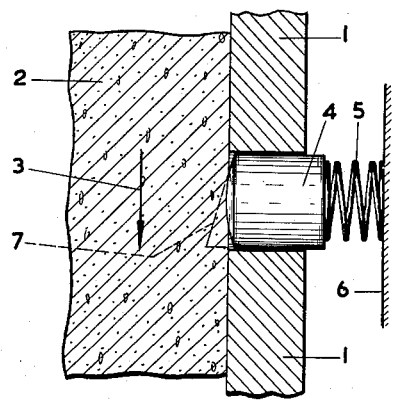
Figure 1 is a diagram showing the principle of the invention.

In Figure 1 the numeral 1 denotes a side-wall of a mould, for a concrete object. The concrete is denoted by 2. The moulding is ejected from the mould according to the arrow 3. The wall 1 comprises a levelling element 4, which is elastically and yieldingly supported by a spring 5 resting on a fixed support 6. When the moulding is ejected from the mould according to the arrow 3, the element 4 levels the surface of the side-wall of the concrete resting against the wall 1, from the point where the element 4 is in contact with the concrete 2, as long as the ejection has not yet started.

The shape of the surface of the element 4 which is in contact with the concrete can be chosen on different considerations. The shape illustrated in the drawing is slightly rounded. This shape might also be more or less wedge-like, as indicated by the dotted line 7. In the direction perpendicular to the plane of the drawing the element might also have a given profile, by means of which it might be possible to obtain particular streaked effects on the surface of the wall of the moulding. The element 4 might also be made of rubber or a similar elastic material, in which case the spring 5 might be dispensed with.

Figure 2:
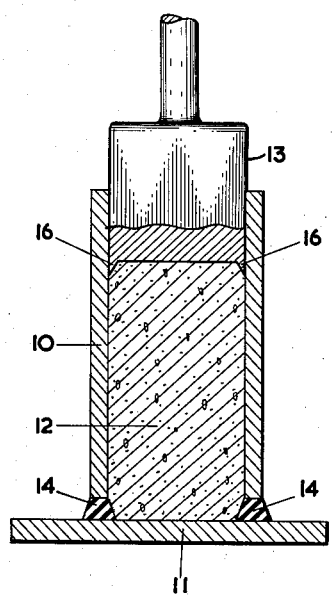
Figure 2 illustrates the making of a concrete paving block according to the invention.
Figure 3:
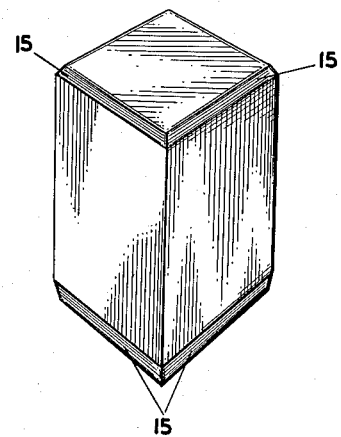
Figure 3 is a perspective view of a moulding paving block.

Figure 2 illustrates the moulding of a rectangular block in the form of a paving element according to Figure 3. The mould 10 is a rectangular box. Usually a number of boxes are combined to a honeycombed unit. The box or boxes 10 is (are) then mounted on a baseplate 11 and filled with concrete mortar 12. This concrete filling is compressed by vibration. It is finished by means of a die 13, which compresses the mass to the correct size and to the desired degree. The base plate 11 is subsequently removed or the moulds 10 are lifted, upon which the die 13 forces the mouldings in the downward direction from the mould 10.

The lower edges of the mould 10 are equipped with slightly wedge-shaped rubber strips 14. When the moulding is forced from the mould 10, these rubber strips level the sides of the moulding in an elastic way. The quality of the concrete surfaces is considerably improved by this. In particular they become non-skiddy. Since this is especially desirable for the upper surface of the paving elements, the desired paving surfaces of the element during the production process have to rest against a sidewall or a partition of the mould. For this purpose the paving element as illustrated may be moulded in the erect position, because this upper surface is then also a lateral plane in the mould. It would of course also be sufficient to level only this upper surface, in which case one of the strips 14 would suffice.

For paving elements a bevelled edge 15 (see Fig. 3) is desirable. This can be automatically formed on the lower side of the block in Figure 2 by giving the rubber strips 14 a specially designed wedge-shaped cross-section. On the upper side it has to be formed, if necessary, by the die 13, to which end this die 13 might, if necessary, be provided with the projecting edges 16. If they have to be formed along the longitudinal ribs of the block, they must be incorporated in the mould, which may of course also be done in the shape of the strips 14.

What I claim is:

A molding apparatus for molding concrete bricks and similar objects of concrete, which apparatus comprises, in combination, a plurality of co-operating mold side walls defining a mold space open at top and bottom, having the cross-sectional configuration of a desired concrete object, a base plate for supporting said mold side walls, a vertically movable die member slidably fitting said mold space cross-section and adapted to be reciprocated in said mold space so as to eject a molded concrete object longitudinally therefrom in sliding relation to said mold side walls, and an elastically yielding levelling member disposed in and protruding inwardly of said side wall of such shape and of such disposition with respect to said molded concrete object as to exert a levelling action on the appertaining surface of a freshly molded object during the ejection of the latter.

References Cited in the file of this patent

UNITED STATES PATENTS

| | | |
|---|---|---|
| 1,484,735 | Norton | Feb. 26, 1924 |
| 2,453,223 | Henderson | Nov. 9, 1948 |
| 2,495,100 | Henderson | Jan. 17, 1950 |
| 2,713,188 | Garvey | July 19, 1955 |
| 2,779,080 | Chidester | Jan. 24, 1957 |